United States Patent [19]

Melquist

[11] 4,154,701

[45] May 15, 1979

[54] OLEFIN POLYMERIZATION CATALYST

[75] Inventor: John L. Melquist, Naperville, Ill.

[73] Assignee: Standard Oil Company (Indiana), Chicago, Ill.

[21] Appl. No.: 901,588

[22] Filed: May 1, 1978

[51] Int. Cl.$^2$ .............................. C08F 4/64; C08F 4/68
[52] U.S. Cl. ............................. 252/429 B; 252/429 C; 526/116
[58] Field of Search ........................ 252/429 B, 429 C

[56] References Cited

U.S. PATENT DOCUMENTS

| | | | |
|---|---|---|---|
| 3,218,266 | 11/1965 | Ludlum | 252/429 C |
| 3,678,019 | 7/1972 | Wagensommer | 252/429 C X |
| 3,678,025 | 7/1972 | Birrell | 252/429 C X |
| 3,859,267 | 1/1975 | Yamaguchi et al. | 252/429 C X |
| 4,008,358 | 2/1977 | Abe et al. | 252/429 C X |

*Primary Examiner*—Patrick Garvin
*Attorney, Agent, or Firm*—Stephen L. Hensley; Arthur G. Gilkes; William T. McClain

[57] ABSTRACT

Olefin polymerization catalyst useful in preparation of polyolefins of broad molecular weight distribution comprising (a) a component prepared by reacting an organoaluminum compound with a mixture comprising a titanium compound, a zirconium compound, and a vanadium compound; and (b) an organoaluminum promoter. The (a) component can be further treated with a deactivating agent. The olefin polymerization performance of the (a) component can be varied depending on the choice of promoter and deactivating agent.

33 Claims, No Drawings

OLEFIN POLYMERIZATION CATALYST

BACKGROUND OF THE INVENTION

This invention relates to olefin polymerization catalysts, and more particularly, to catalysts which comprise (a) the reaction product of an organoaluminum compound with a mixture comprising a titanium compound, a zirconium compound, and a vanadium compound; and (b) an organoaluminum promoter, and which are useful in the preparation of olefin polymers, and particularly ethylene polymers, having a broad and controllable molecular weight distribution.

In the low pressure polymerization of olefins, it is well known to employ high activity catalysts comprising an organoaluminum promoter and a component prepared by reducing one or more transition metal compounds with an organoaluminum compound. The use of such high activity catalysts is particularly advantageous in that polyolefins can be produced in yields which are sufficiently high to reduce the relative concentration of catalyst residues in the polymeric product to such an extent that a commercially useful product can be obtained without the need for removal of catalyst residues. However, the processability of the polymeric product and the suitability thereof for use in a variety of applications also are important factors, and to these ends, it is desirable to provide polyolefins having a broad molecular weight distribution and to be able to control molecular weight distributions. As is well known, polyolefin molecular weight distributions often vary depending upon the choice of polymerization catalyst, and, for a given catalyst system, variations in preparation of the catalysts or components thereof often affords means for exercising some degree of control over molecular weight distributions.

Prior art proposals to provide high activity catalysts containing combinations of transition metal compounds and useful in the preparation of polyolefins having a broad and controllable molecular weight distribution have met with varying degrees of success. One such proposal can be found in U.S. Pat. No. 3,218,266, which discloses olefin polymerization catalysts comprising an alkylaluminum promoter and a component prepared by treating a mixture of a titanium (IV) alkoxyhalide and vanadium tetrachloride or vanadium oxytrichloride with a reducing agent such as an alkylaluminum compound. U.S. Pat. No. 3,859,267 discloses olefin polymerization catalysts comprising an alkylaluminum promoter and a component prepared by reducing a mixture of a titanium tetrahalide, a titanium (IV) alkoxyhalide, and a vanadium oxydihalide with an alkylaluminum compound. It is disclosed further that the molecular weight distribution of polyolefins prepared in the presence of the catalysts can be influenced by adding water or adjusting reaction temperatures during catalyst preparation. A related proposal can be found in U.S. Pat. No. 4,008,358, which discloses olefin polymerization catalysts comprising an alkylaluminum promoter and a solid component prepared by mixing a titanium tetrahalide, a vanadium oxytrichloride, and a vanadium oxyalkoxide and then treating the resulting mixture with an alkylaluminum compound. U.S. Pat. No. 3,678,025 discloses a mixed catalyst system comprising (1) an alkylaluminum reduced titanium or vanadium halide, oxyhalide, alcoholate, alkoxide, or ester, and (2) an alkylaluminum reduced zirconium halide or oxyhalide. It is disclosed that olefins can be polymerized in the presence of such a catalyst system by separately introducing the catalyst components into a polymerization zone, promoting the components with an alkylaluminum compound, and contacting the catalyst with an olefin under polymerizing conditions. It is disclosed further that polymer molecular weight distributions can be controlled by varying the relative concentrations of the reduced titanium and reduced zirconium components.

Despite the above-described prior art proposals, there still is a need for a high activity catalyst useful in the preparation of polyolefins having a broad and controllable molecular weight distribution. It is an object of this invention to provide such a catalyst. A further object of the invention is to provide a catalyst component capable of being varied in terms of olefin polymerization performance by relatively simple means. Other objects of the invention will be apparent to persons of skill in the art from the following description and appended claims.

It has now been found that the objects of this invention can be achieved by reducing a ternary mixture of transition metal compounds, comprising at least one titanium compound, at least one zirconium compound, and at least one vanadium compound, with an organometallic reducing agent and promoting the resulting active catalyst component with an organoaluminum promoter. The activity of the catalyst and the molecular weight distribution of polyolefins produced in the presence thereof are a strong function of the choice of promoter. Moreover, the active component of the invented catalysts can be treated with a deactivating agent to temporarily and reversibly deactivate the component and thereby facilitate the use thereof in polymerization systems in which catalyst is washed into a polymerization zone in an olefin rich recycle stream or otherwise contacts polymerizable monomer prior to entry into a polymerization zone, and further, upon activation of the deactivated catalyst component and polymerization of olefins in the presence thereof, variations in catalyst activities and broadening and narrowing of polyolefin molecular weight distributions can be achieved depending on the choice of deactivating agent. Moreover, the sensitivity of the invented catalysts to hydrogen, commonly used in olefin polymerization to control polymer molecular weights, varies depending on the choice of promoter and deactivator and this allows for simple control of polyolefin melt indices. This promoter, deactivator, and hydrogen sensitivity of the invented catalysts renders the same highly versatile in that the olefin polymerization performance thereof can be varied by relatively simple means such that a single active component can be used to produce polyolefins having a wide range of utilities.

The above-described promoter, deactivator, and hydrogen effects on olefin polymerization performance could not have been predicted on the basis of the performance of known catalysts comprising an organoaluminum promoter and an organoaluminum treated mixture of two transition metal compounds, and it is believed that the combined presence of titanium, zirconium, and vanadium in the active component of the invented catalysts is essential to the olefin polymerization performance thereof. Although known catalysts containing organoaluminum reduced mixtures of titanium and vanadium or titanium and zirconium compounds can exhibit high activities and can be employed in the preparation of polyolefins having a broad molecular weight distribution, such catalysts do not exhibit the promoter, deactivator, and hydrogen sensitivity of the invented catalysts. Attempts to catalyze the polymerization of olefins with organoaluminum reduced mixtures of vanadium and zirconium compounds have met with little success due to poor activities.

SUMMARY OF THE INVENTION

Briefly, the catalyst compositions of this invention comprise (a) an active component prepared by reacting an organoaluminum compound with a mixture comprising (1) at least one titanium (IV) alkoxide, alkoxyhalide, or halide; (2) at least one zirconium (IV) alkoxide, alkoxyhalide, or halide; and (3) at least one vanadium (III) halide, vanadium (IV) oxydihalide or halide, or vanadium (V) oxyalkoxide, oxyalkoxyhalide, or oxyhalide; and (b) an organoaluminum promoter. The active component, (a), can be treated further with a material capable of temporarily and reversibly deactivating the component.

The precise structure and composition of the active component of the invented catalysts are not presently known although it appears that the solid obtained from the reduction of the transition metal compound mixture with the organoaluminum compound is a homogeneous system as opposed to a physical mixture of individual reduced transition metal compounds. In view of this uncertainty as to the composition and structure of the active component, catalyst amounts and activities are expressed herein in terms of an equivalent amount of the sum of titanium trihalide, zirconium trihalide, and vanadium trihalide contained in the active component. For purposes hereof, the equivalent amount of titanium trihalide, zirconium trihalide, and vanadium trihalide can be calculated by determining the number of mols of each transition metal used in preparation of the active component, multiplying by the molecular weight of the corresponding trihalide, and adding the resulting values.

As used herein, MI refers to polyolefin melt index as determined according to A.S.T.M. D-1238-65T Condition E and represents a measure of polyolefin molecular weight and processability. $MF_{10}/MF_1$ is employed herein as an indication of polyolefin molecular weight distribution and is defined as the ratio of polymer melt index determined according to A.S.T.M. D-1238-65T Condition F to melt index determined according to A.S.T.M. D-1238-65T Condition E.

DETAILED DESCRIPTION OF THE INVENTION

Titanium compounds useful in preparation of the catalysts of this invention are represented by the formula $Ti(OR)_mX_{4-m}$, wherein R is a hydrocarbon radical and preferably an alkyl radical having 1 to about 6 carbon atoms, X is halogen and preferably chlorine, and m runs from 0 to 4. Examples of useful titanium compounds include titanium tetrahalides such as $TiCl_4$, $TiBr_4$; titanium alkoxytrihalides such as $Ti(OCH_3)Br_3$, $Ti(OC_2H_5)Cl_3$, $Ti(OC_4H_9)Cl_3$, and $Ti(OC_6H_{13})Br_3$; titanium dialkoxydihalides such as $Ti(OCH_3)_2Br_2$, $Ti(OC_2H_5)_2Cl_2$, $Ti(OC_4H_9)_2Cl_2$, and $Ti(OC_6H_{13})_2Br_2$; titanium trialkoxyhalides such as $Ti(OCH_3)_3Br$, $Ti(OC_2H_5)_3Cl$, $Ti(OC_4H_9)_3Cl$, and $Ti(OC_6H_{13})_3Br$; and titanium tetraalkoxides such as $Ti(OCH_3)_4$, $Ti(OC_2H_5)_4$, $Ti(OC_4H_9)_4$, $Ti(OC_5H_{11})_4$, and $Ti(OC_6H_{13})_4$. Mixtures also can be employed. Preferred titanium compounds are the tetraalkoxides, and particularly, titanium tetrabutoxide.

Useful zirconium compounds are those having the formula $Zr(OR)_mX_{4-m}$, wherein R, X, and m are as described above. Exemplary zirconium compounds include zirconium tetrahalides such as $ZrCl_4$ and $ZrBr_4$, zirconium alkoxytrihalides such as $Zr(OCH_3)Br_3$, $Zr(OC_2H_5)Cl_3$, $Zr(OC_4H_9)Cl_3$, and $Zr(OC_6H_{13})Br_3$; zirconium dialkoxydihalides such as $Zr(OCH_3)_2Br_2$, $Zr(OC_2H_5)_2Cl_2$, $Zr(OC_4H_9)_2Cl_2$, and $Zr(OC_6H_{13})_2Br_2$; zirconium trialkoxyhalides such as $Zr(OCH_3)_3Cl$, $Zr(OC_2H_5)_3Br$, $Zr(OC_4H_9)_3Cl$, and $Zr(OC_6H_{13})_3Br$; and zirconium tetraalkoxides such as $Zr(OCH_3)_4$, $Zr(OC_2H_5)_4$, $Zr(OC_3H_7)_4$, $Zr(OC_4H_9)_4$, and $Zr(OC_6H_{13})_4$. Mixtures also can be employed. The preferred zirconium compounds are the tetraalkoxides, and particularly, zirconium tetrabutoxide.

Useful vanadium compounds are those of the formula $VX_n$, $VOX_2$, or $VO(OR)_pX_{3-p}$ wherein n is 3 or 4, X and R are as described above, and p runs from 0 to 3. Examples include vanadium tri- and tetrahalides such as $VCl_3$, $VBr_3$, $VCl_4$, and $VBr_4$; vanadium oxydihalides such as $VOCl_2$ and $VOBr_2$; vanadium oxytrihalides such as $VOCl_3$, and $VOBr_3$; vanadium oxyalkoxydihalides such as $VO(OCH_3)Br_2$, $VO(OC_2H_5)Cl_2$, $VO(OC_3H_7)Br_2$, $VO(OC_4H_9)Cl_2$, and $VO(OC_6H_{13})Br_2$; vanadium oxydialkoxyhalides such as $VO(OCH_3)_2Br$, $VO(OC_2H_5)_2Cl$, $VO(OC_4H_9)_2Cl$, and $VO(OC_6H_{13})_2Br$; and vanadium oxytrialkoxides such as $VO(OCH_3)_3$, $VO(OC_2H_5)_3$, $VO(OC_3H_7)_3$, $VO(OC_4H_9)_3$, $VO(OC_5H_{11})_3$, and $VO(OC_6H_{13})_3$. Again, mixtures can be employed. Preferred vanadium compounds are the trichlorides, tetrachlorides, oxydichlorides, oxytrichlorides, and oxytrialkoxides. Most preferably, the vanadium compound is vanadium trichloride, or vanadium oxytrichloride.

Useful organoaluminum compounds are represented by the formula $AlR_qX_{3-q}$, wherein R and X are as described above and q runs from 1 to 3. Such compounds include trialkylaluminums such as triethyl-, triisobutyl-, and trihexylaluminum, dialkylaluminum halides such as diethyl-, diisobutyl- or dihexylaluminum chloride or bromide, and alkylaluminum dihalides such as ethyl-, isobutyl- or hexylaluminum dichloride or dibromide. Mixtures, such as alkylaluminum sesquihalides, also can be employed. The choice of organoaluminum compound is dependent upon the titanium, zirconium, and vanadium compounds employed in that the former must supply a sufficient amount of halides to form an active catalyst component. When each of the titanium, zirconium, and vanadium compounds contains halogen, any of the above described organoaluminum compounds can be employed. However, when fewer than all of the transition metal compounds employed contain halogen, the organoaluminum compound should be a material containing at least one halogen such as a dialkylaluminum halide or an alkylaluminum dihalide. Independent of the choice of titanium, zirconium, and vanadium compounds, the preferred organoaluminum compounds are the alkylaluminum dihalides, and most preferably, ethylaluminum dichloride.

The active component of the catalysts of this invention is prepared by mixing the titanium, zirconium, and vanadium compounds and treating the mixture with the organoaluminum compound. Both mixing and treating are preferably carried out in the presence of an inert hydrocarbon diluent. The temperature, time, and order of mixing of the titanium, zirconium, and vanadium compounds are not critical. However, if a diluent is employed, the temperature should not exceed the boiling point thereof. It also is efficacious to avoid exposure of the compounds to conditions more harsh than necessary, and therefore, mixing is desirably carried out at temperature ranging from about 0° to about 100° C. Diluents useful in preparation of the mixture of transition metal compounds include alkanes, such as hexane, heptane, octanes, or decanes; cycloalkanes such as cyclohexane; aromatics and halogenated aromatics such as benzene or chlorobenzene. Preferred diluents are the alkanes, and particularly hexane. Preferably, the diluent is purified prior to use such as by percolation through molecular sieves and/or silica gel to remove traces of oxygen, water, carbon dioxide, polar compounds, and other impurities capable of adversely affecting catalyst activity.

In preparing the mixture of titanium, zirconium, and vanadium compounds, the individual compounds are employed in concentrations such that the atomic ratio of titanium to zirconium and the atomic ratio of titanium to vanadium each range from about 0.1 to about 10, and preferably, from about 0.2 to about 2.

Following mixing of the titanium, zirconium, and vanadium compounds, the resultant mixture is reacted with the organoaluminum compound. Preferably, the mixture of transition metal compounds is diluted with an inert hydrocarbon reaction medium prior to addition of the organoaluminum compound. The organoaluminum compound also can be employed in the form of a solution in the reaction medium although it also is contemplated to employ the material as a neat liquid. Materials suitable for use as a reaction medium are those materials useful as diluents in the mixing of the titanium, zirconium, and vanadium components as described above. Again, prior to use it is desirable to purify the reaction medium to remove impurities capable of adversely affecting catalyst activity.

In treating the mixture of transition metal compounds with the organoaluminum compound, the reaction temperature is not critical, although the boiling point of the diluent, if any, should not be exceeded. In order to avoid exposure of the reactants to conditions more severe than necessary, temperatures ranging from about 0° to about 100° C. are preferred. The reaction time generally ranges from about one-half hour up to about 48 hours, and preferably from about 2 to about 8 hours. The organoaluminum compound is employed in an amount which is sufficient to reduce the titanium, zirconium, and vanadium. Generally, the atomic ratio of aluminum to the sum of the titanium, zirconium, and vanadium ranges from about 0.5 to about 40, and preferably, from about 2 to about 20.

As a result of the above-described reaction there is obtained a solid, finely divided, active catalyst component or suspension thereof in the reaction medium, which can be used in the polymerization of olefins. If a reaction medium is used, the active catalyst component can be removed therefrom, such as by filtration or decantation, and then dried or resuspended in a diluent prior to use.

Also prior to use in the polymerization of olefins, the active catalyst component can be temporarily and reversibly deactivated by treatment with a deactivating agent. Useful deactivating agents are well known to persons of skill in the art and include oxygen, water, anhydrous acids such as hydrogen halides and a variety of alcohols, phenols, ethers, ketones, aldehydes, organic acids and esters thereof, mercaptans, and disulfides. Further details with respect to specific deactivating agents and the use thereof can be found in U.S. Pat. No. 3,708,465 to Dietrich et al.; Belgium Pat. No. 848,223 to Coover et al.; *Journal of Polymer Science and Technology:* Part A-1, Vol. 4, pages 2583–2596 (1966); and High Polymer, Volume XX, page 371, Interscience Pub. (1965), which are incorporated herein by reference.

Deactivation treatment according to this invention comprises contacting the active catalyst component, prepared as described above, with a deactivating agent in an amount sufficient to reduce the olefin polymerization activity of the component at 25° C. by at least about 75%, and preferably, by at least about 90%. The effective amount of deactivating agent will vary somewhat depending on the material to be employed and is known to persons of skill in the art. Generally, however, the effective amount ranges up to about 10, and preferably, from about 0.1 to 1.5 mols per mol of metal alkyl groups contained in the active catalyst component. Total mols of metal alkyl groups in the active component may differ from the number of mols of metal alkyl groups contained in the organoaluminum component employed in preparation of the active catalyst component, however, for purposes hereof, deactivator concentrations can be calculated on the basis of the latter.

Treatment of the active catalyst component with the deactivating agent preferably is carried out in the presence of an inert diluent, and more preferably, by adding a solution of deactivating agent in an inert diluent to a suspension of the active catalyst component in a diluent. Of course gaseous deactivators, such as oxygen and certain anhydrous acids, can be employed by passing the gas over the suspension of active catalyst component, bubbling the gas through the suspension of active catalyst component, or other suitable means. Useful diluents include those materials useful in preparation of the mixture of titanium, zirconium, and vanadium compounds, with hexane being preferred. Again, it is desirable to purify the diluent prior to use. The time and temperature of the deactivation treatment are not critical, although temperatures ranging from about 0° to about 100° C. have been found convenient. Further details with respect to deactivation treatment with a variety of the deactivating agents and the use of deactivated catalyst components can be found in U.S. application Ser. No. 854,831 which is incorporated herein by reference.

As a result of the above-described treatment, there is obtained a finely divided, temporarily and reversibly deactivated catalyst component suspended in an inert diluent. If desired, the component can be separated from the diluent and dried or resuspended in fresh diluent.

In a particularly desirable embodiment of this invention, the above-described deactivation treatment is carried out using a deactivating agent capable of varying the olefin polymerization performance of the active catalyst component upon activation thereof with an alkylaluminum promoter and polymerization of olefins in the presence thereof. Preferred deactivating agents are those materials capable of broadening or narrowing polyolefin molecular weight distributions without substantial decreases in catalyst activities.

Particularly preferred deactivators capable of narrowing polyolefin molecular weight distributions with increases, or only insubstantial decreases in activity are aliphatic alcohols containing from 1 to about 6 carbon atoms such as methanol, ethanol, propanols, butanols, pentanols, hexanols, and mixtures thereof. The preferred alcohol is ethanol. Deactivation treatment of an active catalyst component with a lower aliphatic alcohol is performed in the manner described above, the alcohol most preferably being employed as a solution in hexane. The effects of alcohol deactivation on catalyst activities and polyolefin molecular weight distributions increases with increasing levels of alcohol. An amount of alcohol which is effective to temporarily and reversibly deactivate an active catalyst component and narrow the molecular weight distribution of polyolefins produced in the presence thereof after activation of the component with an alkylaluminum promoter without substantial decreases in catalyst activity generally ranges up to about 10 mols per mol of metal alkyl groups contained in the active component as defined above. Preferred alcohol concentrations range from about 0.1 to about 1.5 mol per mol of metal alkyl groups.

Particularly preferred deactivating agents capable of broadening polyolefin molecular weight distributions without substantial decreases in catalyst activity are the anhydrous hydrogen halides, and particularly, hydrochloric acid. Deactivation treatment with a hydrogen halide is carried out in the manner described above. In the case of anhydrous hydrochloric acid it is preferred to pass or bubble the gas through the suspension of active catalyst component while stirring the suspension. An amount of hydrogen halide which is effective to temporarily and reversibly deactivate the active catalyst component and broaden polyolefin molecular weight distributions without substantial decreases in catalyst activities upon activation of the deactivated catalyst component with an alkylaluminum promoter and polymerization of olefins in the presence thereof ranges up to about 10 mols of anhydrous acid per mol of metal alkyl groups as described above. Preferred anhydrous acid concentrations range from about 0.5 to about 1.5 mols per mol of metal alkyl groups.

Other deactivators capable of temporarily and reversibly deactivating the active component of the invented catalysts and improving the olefin polymerization performance thereof upon activation with an alkylaluminum promoter can be readily determined by persons of skill in the art by routine experimentation in accordance with the examples herein.

Prior to use of the active or temporarily and reversibly deactivated component of the invented catalyst compositions in the polymerization of olefins, the component must be promoted with a second catalyst component which is an organoaluminum compound. Useful organoaluminum promoters are compounds of the formula $AlR_mX'_{3-q}$ wherein R is a hydrocarbon radical of one to six carbon atoms, X' is hydrogen or halogen, and q runs from 1 to 3. Examples of such compounds include the organoaluminum compounds useful in treating the mixture of transition metal compounds; alkylaluminum dihydrides such as ethyl-, isobutyl-, or hexylaluminum dihydride; and dialkylaluminum hydrides such as diethyl-, diisobutyl-, or dihexylaluminum hydride. Mixtures also can be employed. From the standpoint of catalyst activity, the most preferred promoter is triisobutylaluminum. However, in order to achieve maximum breadth of polyolefin molecular weight distributions, triethylaluminum is the most preferred promoter.

The organoaluminum promoter is employed in an amount which is effective to promote the activity of the active or temporarily and reversibly deactivated catalyst component. Generally, an effective amount is at least about 2 millimols of promoter per gram of solid catalyst component. Preferably, the ratio of millimols of promoter to grams of solid catalyst component is at least about 10:1, and more preferably, at least about 25:1. In slurry polymerization processes, a portion of the promoter can be employed to pretreat the polymerization medium if desired.

The promoted, active or temporarily and reversibly deactivated catalyst component described above can be used in particle form polymerization or in a solventless process wherein the olefin is polymerized directly from the vapor phase. The polymerization temperature using a solventless process should be high enough to give an adequate polymerization rate but not too large to raise the pressure above that which is normally used in this type of process, i.e., up to about several hundred p.s.i.g. or soften the polymer bed contained in the reactor.

In the particle form or slurry process, the polymerization is carried out at a temperature such that the polymer as formed is a solid in the polymerization reactor. The preferred polymerization temperature is about 40° C. to about 110° C. In a vapor phase process wherein little or no liquid medium is used, the preferred temperature range is from about 40° C. to about 130° C. and, more preferably, from about 60° C. to about 120° C.

The preferred olefin to be polymerized is ethylene, however the catalysts of this invention also are useful for the polymerization of mixtures of ethylene with up to about twenty mol percent of other terminal olefins such as propylene, butene-1, pentene-1, and dienes such as butadiene and isoprene, etc.

It is of particular importance for best results that the olefin, be substantially free of catalyst poisons. Accordingly, it is preferred to use polymerization grade olefin and to pass it through a molecular sieve prior to use to remove any remaining traces of moisture, oxygen, carbon dioxide and polar organic compounds.

The organic liquid employed as the polymerization medium in the particle form process can be an aliphatic alkane or cycloalkane such as butane, isobutane, pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene or xylene or a halogenated aromatic compound such as chlorobenzene, chloronaphthalene or ortho-dichlorobenzene. The nature of the medium is subject to considerable variation, although the medium employed should be liquid under the conditions of reaction and relatively inert. Other media which can be used include ethylbenzene, isopropylbenzene, ethyltoluene, n-propylbenzene, diethylbenzenes, mono- and dialkylnaphthalenes, n-octane, isooctane and methylcyclohexane. Preferably, a hexane or a butane is employed. For best results, the polymerization media employed in particle form polymerization should be purified to remove traces of moisture, oxygen, carbon dioxide and polar organic compounds prior to use by contacting the medium, for example, in a distillation procedure, with an organoaluminum compound, for example, triethylaluminum, prior to or after percolating the medium through silica gel or molecular sieves.

The polymerization time is not critical and will usually be on the order of thirty minutes to several hours in batch processes. Contact times of from one to four hours are commonly employed in autoclave type reactions. When a continuous process is employed, the contact time in the polymerization zone can also be regulated as desired, and in some cases it is not necessary to employ reaction or contact times much beyond one-half to several hours because a continuous system, wherein polymerization medium, if any, and excess monomer are returned to a charging zone and catalyst is replenished and additional monomer introduced, can be employed.

Preferably, the total pressure range for the polymerization process is about atmospheric to over 1000 p.s.i.g. More preferably, the polymerization pressure is greater than about 100 p.s.i.g. and, most preferably, the polymerization pressure is about 200 p.s.i.g. or higher.

The novel catalyst composition of this invention when employed for the polymerization of olefins is used with hydrogen to control molecular weight. Solid polymers having molecular weights greater than about 50,000 and less than about 3,000,000 result thereby. The amount of hydrogen to be used depends upon the molecular weight to be obtained and can be easily determined by those skilled in the art based on the examples appearing hereinbelow.

Polyolefins prepared in the presence of the catalysts of this invention exhibit a wide range of molecular weight distributions and can be processed by a variety of techniques, including extrusion, mechanical melting, casting, and molding, to form a variety of useful articles including films, sheets, plates, and molded objects.

The following examples illustrate the present invention and are not to be construed as limiting the scope thereof.

EXAMPLE I

A. Preparation of Active Catalyst Components.

Active catalyst components were prepared at ambient temperature under a nitrogen atmosphere according to the following procedure. Into a 300 ml. round bottom flask equipped with magnetic stirrer were added hexane, followed by titanium tetrabutoxide, followed by zirconium tetrabutoxide, followed by vanadium oxytrichloride, in the amounts specified below. Stirring of the contents of the flask was begun after addition of the titanium tetrabutoxide and continued for about 10 to 20 minutes after addition of the vanadium oxytrichloride at which point the flask was placed in a room temperature water bath. After 5 to 10 minutes, dropwise addition of a hexane solution of ethylaluminum dichloride (50 wt.% unless otherwise indicated) in the amounts specified below was begun and the contents of the flask were stirred. Addition of the ethylaluminum dichloride solution was completed in 1½ to 2½ hours and stirring was continued for three to four hours thereafter.

(1) 15 ml. hexane, 8.5 ml. titanium tetrabutoxide, 5.5 ml. zirconium tetrabutoxide, 1.1 ml. vanadium oxytrichloride, and 74 ml. ethylaluminum dichloride solution were used in the preparation of this component. The atomic ratio of titanium to zirconium to vanadium to aluminum was 1:0.5:0.5:10.

(2) 60 ml. hexane, 34 ml. titanium tetrabutoxide, 22 ml. zirconium tetrabutoxide, 4.7 ml. vanadium oxytrichloride, and 297 ml. ethylaluminum dichloride solution were used in the preparation of this component. Again, the titanium to zirconium to vanadium to aluminum atomic ratio was 1:0.5:0.5:10.

(3) 25 ml. hexane, 14 ml. titanium tetrabutoxide, 9 ml. zirconium tetrabutoxide, 1.1 ml. vanadium oxytrichloride and 237 ml. ethylaluminum dichloride solution were used in the preparation of this component. The titanium to zirconium to vanadium to aluminum atomic ratio was 1:0.5:0.29:20.

(4) 15 ml. hexane, 8.5 ml. titanium tetrabutoxide, 5.5 ml. zirconium tetrabutoxide, 1.2 ml. vanadium oxytrichloride, and 74 ml. ethylaluminum dichloride solution were used in preparation of this component. The titanium to zirconium to vanadium to aluminum atomic ratio was 1:0.5:0.5:10.

(5) A 3 ml. portion of the slurry of active component prepared in (1) was removed and an additional 36 ml. of ethylaluminum dichloride solution was added dropwise to the remainder over a 1 hour period while stirring the contents of the flask. Stirring was continued for an additional 5 hours. The titanium to zirconium to vanadium to aluminum atomic ratio was 1:0.5:0.5:15.

B. Polymerizations.

A series of ethylene polmyerizations were carried out using aliquots of active catalyst component slurries (1)–(5). Unless otherwise indicated, the slurry of catalyst component and an amount of organoaluminum promoter were stirred into 261 ml. hexane in a 500 ml. stainless steel autoclave reactor and polymerization grade ethylene was polymerized at 180° F. under varying hydrogen pressures and ethylene pressures sufficient to maintain a total pressure (hydrogen and ethylene) of 300 psig in the reactor. After one hour, ethylene was vented from the reactor, the reactor was opened, and the slurry of polymeric product was poured into a Buchner funnel to separate the polymer from the hexane and vacuum dry the former.

For each polymerization run, the amount of active component employed, the promoter employed, hydrogen pressure, catalyst activity (Act.), polymer melt index (MI) determined according to A.S.T.M. D-1238-65T Condition E, and ratio ($MF_{10}/MF_1$) of melt index according to A.S.T.M. D-1238-65T Condition F to MI are reported in TABLE I. As used in the table, TEA refers to triethylaluminum and TIBA refers to triisobutylaluminum. In triethylaluminum promoted runs the following amounts of promoter were employed: 40 mg. for runs using active components (1) and (5); 60 mg. for runs using active components (3) and (4); and 80 mg. for runs using active component (2). In triisobutylaluminum promoted runs the following amounts of promoter were used: 99 mg. in runs using active components (1), (3), and (5); 132 mg. in runs using active component (4); and 198 mg. in runs using active component (2).

TABLE I

| Catalyst Component Amount (mg.)* | Promoter | Act.* $H_2$** | $\left(\dfrac{kg./g.}{hr.}\right)$ | MI $\left(\dfrac{dg.}{min.}\right)$ | $\dfrac{MF_{10}}{MF_1}$ |
|---|---|---|---|---|---|
| (1) | | | | | |
| 3.0 | TEA | 160 | 6.3 | 0.17 | 89 |
| 6.0 | TEA | 180 | 6.7 | 0.57 | 100 |
| 6.0 | TEA | 200 | 5.4 | 0.68 | 91 |
| 1.5 | TIBA | 90 | 29 | 0.20 | 50 |
| 2.1 | TIBA | 100 | 27 | 0.49 | 56 |
| 3.0 | TIBA | 120 | 17 | 0.77 | 62 |
| (2) | | | | | |
| 6.0*** | TEA | 140 | 5.5 | 0.17 | 73 |
| 4.0 | TEA | 160 | 5.6 | 0.21 | 80 |
| 6.0 | TEA | 180 | 4.5 | 0.52 | 87 |

TABLE I-continued

| Catalyst Component Amount (mg.)* | Promoter | H₂** | Act.* $\left(\frac{kg./g.}{hr.}\right)$ | MI $\left(\frac{dg.}{min.}\right)$ | $\frac{MF_{10}}{MF_1}$ |
|---|---|---|---|---|---|
| 6.0 | TEA | 200 | 3.2 | 0.55 | 85 |
| 6.0 | TEA | 200 | 4.1 | 0.56 | 82 |
| 6.0 | TEA | 200 | 3.7 | 0.53 | 82 |
| 2.0 | TIBA | 100 | 19 | 0.38 | 50 |
| 2.6 | TIBA | 120 | 16 | 0.78 | 54 |
| 2.0 | TIBA | 140 | 16 | 0.78 | 58 |
| 4.0 | TIBA | 160 | 9.4 | 1.9 | 61 |
| 6.0 | TIBA | 200 | 5.5 | 3.2 | 71 |
| (3) | | | | | |
| 4.3 | TEA | 100 | 10 | 0.33 | 59 |
| 4.3 | TEA | 120 | 7.8 | 0.30 | 79 |
| 3.0 | TIBA | 80 | 14 | 0.15 | 55 |
| 3.0 | TIBA | 90 | 13 | 0.28 | 50 |
| (4) | | | | | |
| 4.0 | TEA | 140 | 6.3 | 0.23 | 70 |
| 4.0 | TEA | 180 | 4.0 | 0.45 | 76 |
| 6.0 | TEA**** | 200 | 3.1 | 0.63 | 79 |
| 2.0 | TIBA | 100 | 24 | 0.56 | 47 |
| 2.0 | TIBA | 110 | 21 | 0.72 | 48 |
| 2.0 | TIBA | 120 | 20 | 1.2 | 49 |
| (5) | | | | | |
| 4.4 | TEA | 160 | 7.2 | 0.33 | 95 |
| 4.4 | TEA | 180 | 5.7 | 0.40 | 102 |
| 5.5 | TEA | 200 | 4.1 | 0.70 | 96 |
| 2.2 | TIBA | 100 | 14 | 0.11 | 69 |
| 3.3 | TIBA | 140 | 10 | 0.31 | 82 |
| 3.3 | TIBA | 160 | 7.8 | 0.41 | 85 |
| 4.4 | TIBA | 180 | 6.1 | 0.69 | 92 |

*Amount of catalyst component employed and activity are calculated on the basis of the equivalent amount of titanium trichloride, zirconium trichloride, and vanadium trichloride.
**psia.
***Polymerization conditions in this run were identical to those described above except that the run was carried out in a 1 liter autoclave reactor and 470 ml. hexane were used.
****80 mg. TEA were used in this run.

EXAMPLE I and TABLE I illustrate the high activity and hydrogen sensitivity of the invented catalysts and that the same are useful in the preparation of polyolefins having a broad molecular weight distribution as indicated by $MF_{10}/MF_1$ ratios. The example and table also illustrate that variations in the olefin polymerization performance of the active component of the invented catalyst composition, and particularly the activity thereof and the molecular weight distribution of polyolefins produced in the presence thereof, is strongly influenced by the choice of promoter.

EXAMPLE II

For comparative purposes, a series of ethylene polymerizations were conducted using catalyst components prepared from varous combinations of two transition metal compounds. Catalyst components were prepared according to the procedure described in EXAMPLE I using the following materials and amounts thereof:

A. 60 ml. hexane, 34 ml. titanium tetrabutoxide, 22 ml. zirconium tetrabutoxide, and 297 ml. ethylaluminum dichloride solution. The titanium to zirconium to vanadium to aluminum atomic ratio was 1:0.5:0:10.

B. 15 ml. hexane, 5.5 ml. zirconium tetrabutoxide, 1.1 ml. vanadium oxytrichloride, and 56 ml. ethylaluminum dichloride solution. The titanium to zirconium to vanadium to aluminum atomic ratio was 0:1:1:15.

C. 15 ml. hexane, 8.5 ml. titanium tetrabutoxide, 1.1 ml. vanadium oxytrichloride, and 56 ml. ethylaluminum dichloride solution. The titanium to zirconium to vanadium to aluminum atomic ratio was 1:0:0.5:7.6.

Polymerizations were conducted according to the procedure described in EXAMPLE I. 80 mg. of promoter were used in the triethylaluminum promoted runs and 198 mg. in the triisobutylaluminum promoted runs. Results are reported in TABLE II.

TABLE II

| Catalyst Component Amount (mg.)* | Promotor | H₂** | Act.* $\left(\frac{kg./g.}{hr.}\right)$ | MI $\left(\frac{dg.}{min.}\right)$ | $\frac{MF_{10}}{MF_1}$ |
|---|---|---|---|---|---|
| A | | | | | |
| 3.4 | TIBA | 100 | 10 | 0.43 | 50 |
| 3.8 | TIBA | 120 | 8.8 | 0.85 | 52 |
| 3.8 | TIBA | 160 | 5.4 | 1.3 | 61 |
| B | | | | | |
| 17 | TEA | 200 | 1.1 | 0.005 | — |
| 5.7 | TIBA | 120 | 2.2 | 0 | — |
| 11 | TIBA | 200 | 1.3 | 0.01 | — |
| C | | | | | |
| 2.8 | TEA | 100 | 11 | 0.41 | 50 |
| 4.0 | TEA | 120 | 9.6 | 1.6 | 49 |
| 2.0 | TIBA | 80 | 22 | 0.50 | 41 |
| 4.0 | TIBA | 120 | 15 | 3.6 | 48 |

*Amount of catalyst component employed and activity are calculated on the basis of the equivalent amount of titanium trichloride, zirconium trichloride, and vanadium trichloride.
**psia.

Comparison of EXAMPLE I and TABLE I with EXAMPLE II and TABLE II reveals that the performance of the invented catalysts could not have been predicted on the basis of the performance of catalyst components prepared by treatment of a mixture of two transition metal compounds with an organoaluminum compound. For example, in EXAMPLE IIA, the atomic ratio of titanium to zirconium to aluminum was 1:0.5:10, the triisobutylaluminum promoted catalyst component exhibited moderate olefin polymerization activity (5.4–10 kg/g/hr.) and the resultant polymer had a relatively broad molecular weight distribution as indicated by $MF_{10}/MF_1$ ratios (50–61). In comparison, the catalyst component prepared in EXAMPLE I.A.(1) using titanium, zirconium, and elemental aluminum in an identical atomic ratio, and additionally, 0.5 mol vanadium per mol of elemental titanium, exhibited substantially higher activities (17–29 kg./g./hr.) when promoted with triisobutylaluminum and employed in olefin polymerization with little change in $MF_{10}/MF_1$ ratios of the resultant polymers. Additionally, EXAMPLE IIC and the corresponding polymerization runs in TABLE II reveal that the choice of promoter had some effect on activity but virtually no effect on $MF_{10}/MF_1$ ratios. In comparison, the catalyst components of EXAMPLE I.A.(1)-(5) were strongly affected in terms of both activity and $MF_{10}/MF_1$ ratios by the choice of promoter as illustrated in TABLE I.

EXAMPLE III

Catalyst components were prepared according to the procedure described in EXAMPLE I from the following materials and amounts thereof:

(1) 15 ml. hexane, 8.5 ml. titanium tetrabutoxide, 5.5 ml. zirconium tetrabutoxide, 3.6 ml. vanadium oxytributoxide, and 74 ml. ethylaluminum dichloride solution. The titanium to zirconium to vanadium to aluminum atomic ratio was 1:0.5:0.5:10.

(2) 15 ml. hexane, 8.5 ml. titanium tetrabutoxide, 5.5 ml. zirconium tetrabutoxide, 1.6 ml. vanadium tetrachloride, and 69 ml. of a 3.6 molar solution of ethylaluminum dichloride in hexane. The titanium to zirconium to vanadium to aluminum atomic ratio was 1:0.5:0.5:10.

(3) 15 ml. hexane, 8.5 ml. titanium tetrabutoxide, 5.5 ml. zirconium tetrabutoxide, 0.6 ml. vanadium oxydichloride, and 74 ml. ethylaluminum dichloride solution. The titanium to zirconium to vanadium to aluminum atomic ratio was 1:0.5:0.5:10.

(4) 15 ml. hexane, 8.5 ml. titanium tetrabutoxide, 5.5 ml. zirconium tetrabutoxide, 2.04 g. vanadium trichloride, and 74 ml. ethylaluminum dichloride solution. The titanium to zirconium to vanadium to aluminum atomic ratio was 1:0.5:0.5:10.

A series of ethylene polymerizations were conducted according to the procedure of EXAMPLE I.B. using active components (1)–(4). In triethylaluminum promoted runs the amount of promoter used was as follows: 60 mg. in runs using components (1) and (2); 80 mg. in runs using component (3); and 40 mg. in runs using component (4). In triisobutylaluminum promoted runs, the amount of promoter used was as follows: 132 mg. in runs using components (1), (2), and (4); and 198 mg. in runs using component (3). In the last run using active component (4), 264 mg. tri-n-hexyl aluminum (TNHA) was used as the promoter. Results are reported in TABLE III.

TABLE III

| Catalyst Component Amount (mg.)* | Promoter | $H_2$** | Act.* $\left(\dfrac{kg./g.}{hr.}\right)$ | MI $\left(\dfrac{dg.}{min.}\right)$ | $\dfrac{MF_{10}}{MF_1}$ |
|---|---|---|---|---|---|
| (1) | | | | | |
| 3.8 | TEA | 120 | 11 | 0.43 | 50 |
| 3.8 | TEA | 140 | 5.6 | 1.6 | 48 |
| 1.9 | TIBA | 100 | 20 | 0.72 | 42 |
| 2.8*** | TIBA | 120 | 17 | 1.2 | 48 |
| (2) | | | | | |
| 3.2 | TEA | 140 | 8.5 | 0.13 | 92 |
| 6.3 | TEA | 160 | 5.6 | 1.2 | 73 |
| 2.1 | TIBA | 120 | 13 | 0.29 | 69 |
| 3.2 | TIBA | 140 | 11 | 0.30 | 70 |
| 3.2 | TIBA | 160 | 12 | 1.7 | 68 |
| (3) | | | | | |
| 6.0 | TEA | 160 | 2.4 | 0.15 | 74 |
| 8.0 | TEA | 180 | 2.1 | 0.27 | 83 |
| 8.0 | TEA | 200 | 1.4 | 0.34 | 86 |
| 2.0 | TIBA | 100 | 13 | 0.50 | 40 |
| 2.0 | TIBA | 140 | 8.8 | 0.77 | 54 |
| 3.0 | TIBA | 160 | 3.7 | 0.89 | 54 |
| (4) | | | | | |
| 2.0 | TEA | 160 | 7.4 | 0.18 | 84 |
| 3.0 | TEA | 180 | 7.9 | 0.39 | 85 |
| 4.0 | TEA | 200 | 8.2 | 0.89 | 93 |
| 2.0 | TIBA | 100 | 29 | 0.21 | 62 |
| 1.0 | TIBA | 120 | 33 | 0.34 | 56 |
| 1.0 | TIBA | 140 | 30 | 0.49 | 60 |
| 1.0 | TNHA | 120 | 36 | 0.58 | 53 |

*Amount of catalyst component employed and activity are calculated on the basis of the equivalent amount of titanium trichloride, zirconium trichloride, and vanadium trichloride.
**psia.
***Polymerization conditions in this run were identical to those described above except that the run was carried out in a 1 liter autoclave reactor and 470 ml. hexane was used EXAMPLE III and TABLE III further illustrate the high activity and hydrogen sensitivity of the invented catalysts, the molecular weight distributions of polyolefins produced using the catalysts, and variations in the olefin polymerization performance of the active catalyst components depending upon the choice of promoter.

EXAMPLE IV

Temporarily and reversibly deactivated catalyst components were prepared as follows:

(1) 3.7 ml. ethanol dissolved in 20 ml. hexane were added to 102 ml. of the slurry of catalyst component prepared in EXAMPLE I.A.(4) at ambient temperature and the resultant mixture was stirred for 3 hours. The molar ratio of ethanol to metal-alkyl groups was 0.26:1.

(2) 3.6 ml. ethanol dissolved in 20 ml. hexane were added to 124 ml. of the slurry prepared in (1) at ambient temperature and the resultant mixture was stirred for 3 hours. The molar ratio of ethanol to metal-alkyl groups was 0.5:1.

(3) 282 ml. of the supernatant from a 416 ml. portion of the slurry of catalyst component prepared in EXAMPLE I.A.(2) was removed by decantation and replaced with 282 ml. hexane. The resultant slurry was then stirred and 40 g. anhydrous hydrochloric acid was passed therethrough at ambient temperature over a period of 80 min. The molar ratio of anhydrous hydrochloric acid to metal-alkyl groups was 1.1. The molar ratio of hydrochloric acid absorbed by the catalyst component to the equivalent amount of titanium trichloride in the catalyst was 3.6:1.

A series of ethylene polymerizations were carried out using the slurries of catalyst component prepared in (1)–(3). The polymerizations were conducted according to the procedure described in EXAMPLE I.B. In triethylaluminum promoted runs the amount of promoter used was 60 mg. for runs employing catalyst components (1) and (2), and 80 mg. for runs employing catalyst component (3). In triisobutylaluminum promoted runs, promoter concentrations were 132 mg. for the runs employing catalyst components (1) and (2) and 198 mg. for runs employing catalyst component (3). Results are reported in TABLE IV.

TABLE IV

| Catalyst Component Amount (mg.)* | Promoter | $H_2$** | Act.* $\left(\dfrac{kg./g.}{hr.}\right)$ | MI $\left(\dfrac{dg.}{min.}\right)$ | $\dfrac{MF_{10}}{MF_1}$ |
|---|---|---|---|---|---|
| (1) | | | | | |
| 4.0 | TEA | 100 | 9.2 | 0.55 | 57 |
| 3.0 | TEA | 150 | 8.2 | 0.62 | 57 |
| 2.0 | TEA | 160 | 7.8 | 0.61 | 55 |
| 2.0 | TIBA | 90 | 27 | 0.37 | 42 |
| 2.0 | TIBA | 100 | 24 | 0.58 | 43 |
| 2.0 | TIBA | 120 | 20 | 0.95 | 44 |
| (2) | | | | | |
| 4.2 | TEA | 120 | 14 | 0.47 | 46 |
| 4.2 | TEA | 130 | 14 | 0.62 | 46 |
| 4.2 | TEA | 140 | 11 | 1.5 | 49 |
| 2.1 | TIBA | 90 | 28 | 0.41 | 37 |
| 4.2 | TIBA | 100 | 27 | 0.63 | 39 |
| 4.2 | TIBA | 120 | 20 | 1.2 | 41 |
| (3) | | | | | |
| 6.0 | TEA | 180 | 4.4 | 0.22 | 97 |
| 6.0 | TEA | 200 | 3.2 | 0.63 | 91 |
| 6.0 | TEA | 200 | 3.2 | 0.33 | 91 |
| 2.0 | TIBA | 120 | 14 | 0.22 | 65 |
| 2.0 | TIBA | 130 | 13 | 0.31 | 64 |
| 2.0 | TIBA | 140 | 17 | 0.46 | 70 |
| 2.0 | TIBA | 160 | 13 | 0.99 | 68 |
| 6.0 | TIBA | 200 | 4.6 | 1.2 | 90 |

*The weight of catalyst component employed and activity were calculated on the basis of the equivalent amount of titanium trichloride, zirconium trichloride, and vanadium trichloride.
**psia.

EXAMPLE IV and TABLE IV illustrate the temporarily and reversibly deactivated catalyst components of this invention and the preparation and use thereof in olefin polymerization. Additionally, the effects of deactivation treatment on olefin polymerization performance of catalyst components can be seen by comparing runs using catalyst components (1) and (2) of TABLE IV with runs using catalyst component (4) in TABLE I, and runs using catalyst component (3) in TABLE IV with runs using catalyst component (2) in TABLE I. For example, it can be seen that ethanol deactivation of catalyst components can lead to a narrowing of molecular weight distributions, as indicated by decreases in $MF_{10}/MF_1$ ratios, with substantial increases in activity, and further, that this effect becomes more pronounced with increases in the amount of ethanol employed. It also can be seen that deactivation treatment with anhydrous hydrochloric acid leads to a broadening of polyolefin molecular weight distributions, as indicated by increases in $MF_{10}/MF_1$ ratios, without substantial decreases in activities. Moreover, TABLE IV shows that the above-described promoter effects on olefin polymerization performance of the invented catalyst components are retained after deactivation treatment.

EXAMPLE V

In order to demonstrate that an organoaluminum promoter is an essential element of the invented catalysts, an ethylene polymerization was carried out according to the procedure of EXAMPLE IB except that no promoter was employed, no hydrogen was used, and the temperature was 80° F. The catalyst component employed was that prepared in EXAMPLE I.A.(2) and the amount used was the equivalent of 10 mg. of titanium trichloride, zirconium trichloride, and vanadium trichloride. After one hour, 0.80 g. of product was recovered indicating that the activity of the unpromoted catalyst component was about 8 g/g./hr.

I claim:
1. An olefin polymerization catalyst composition useful in the preparation of polyolefins having a broad and controllable molecular weight distribution comprising (a) an active component prepared by reacting a mixture comprising:
   (1) at least one titanium compound of the formula $Ti(OR)_mX_{4-m}$ wherein R is a hydrocarbon radical, X is halogen, and m runs from 0 to 4;
   (2) at least one zirconium compound of the formula $Zr(OR)_mX_{4-m}$, wherein R, X, and m are as described in (1); and
   (3) at least one vanadium compound having a formula selected from the group consisting of $VX_n$, $VOX_2$, and $VO(OR)_pX_{3-p}$ wherein R and X are as described in (1), n is 3 or 4, and p runs from 0 to 3
with at least one organoaluminum compound of the formula $AlR_qX_{3-q}$, wherein R and X are as defined in (1) and q runs from 1 to 3 and is selected such that said organoaluminum compound contains sufficient halogen to form an active catalyst component; said components being reacted in an amount such that the atomic ratio of titanium to zirconium ranges from about 0.1 to about 10, the atomic ratio of titanium to vanadium ranges from about 0.1 to about 10, and the atomic ratio of aluminum to the sum of the titanium, zirconium, and vanadium ranges from about 0.5 to about 40; and (b) an organoaluminum promoter of the formula $AlR_qX'_{3-q}$ wherein R is as described in (1), q runs from 1 to 3, and X' is hydrogen or halogen.

2. The composition of claim 1 wherein the titanium compound is a titanium tetraalkoxide, the zirconium compound is a zirconium tetraalkoxide, the vanadium compound is selected from the group consisting of vanadium trichloride, vanadium tetrachloride, vanadium oxydichloride, vanadium oxytrichloride, and vanadium oxytrialkoxide, the organoaluminum compound is an alkylaluminum dihalide, and the organoaluminum promoter is a lower alkyl trialkylaluminum.

3. The composition of claim 2 wherein the titanium tetraalkoxide is titanium tetrabutoxide, the zirconium tetraalkoxide is zirconium tetrabutoxide, the alkylaluminum dihalide is ethylaluminum dichloride, and the lower alkyl trialkylaluminum promoter is triethylaluminum.

4. The composition of claim 3 wherein the vanadium compound is vanadium trichloride.

5. The composition of claim 3 wherein the vanadium compound is vanadium oxytrichloride.

6. The composition of claim 2 wherein the titanium tetraalkoxide is titanium tetrabutoxide, the zirconium tetraalkoxide is zirconium tetrabutoxide, the alkylaluminum dihalide is ethylaluminum dichloride, and the lower alkyl trialkylaluminum promoter is triisobutylaluminum.

7. The composition of claim 6 wherein the vanadium compound is vanadium trichloride.

8. The composition of claim 6 wherein the vanadium compound is vanadium oxytrichloride.

9. The composition of claim 1 wherein the (a) component has been treated with a deactivating agent in an amount which is effective to temporarily and reversibly deactivate said component.

10. The composition of claim 9 wherein the deactivating agent is a material capable of improving the olefin polymerization performance of the catalyst composition.

11. The composition of claim 10 wherein the deactivating agent is a lower aliphatic alcohol.

12. The composition of claim 11 wherein the titanium compound is a titanium tetraalkoxide, the zirconium compound is a zirconium tetraalkoxide, the vanadium compound is selected from the group consisting of vanadium trichloride, vanadium tetrachloride, vanadium oxydichloride, vanadium oxytrichloride, and vanadium oxytrialkoxide, the organoaluminum compound is an alkylaluminum dihalide, and the organoaluminum promoter is a lower alkyl trialkylaluminum.

13. The composition of claim 12 wherein the titanium tetraalkoxide is titanium tetrabutoxide, the zirconium tetraalkoxide is zirconium tetrabutoxide, the alkylaluminum dihalide is ethylaluminum dichloride, and the lower alkyl trialkylaluminum promoter is triethylaluminum.

14. The composition of claim 13 wherein the deactivating agent is ethanol.

15. The composition of claim 14 wherein the vanadium compound is vanadium trichloride.

16. The composition of claim 14 wherein the vanadium compound is vanadium oxytrichloride.

17. The composition of claim 12 wherein the titanium tetraalkoxide is titanium tetrabutoxide, the zirconium tetraalkoxide is zirconium tetrabutoxide, the alkylaluminum dihalide is ethylaluminum dichloride, and the lower alkyl trialkylaluminum promoter is triisobutylaluminum.

18. The composition of claim 17 wherein the deactivating agent is ethanol.

19. The composition of claim 18 wherein the vanadium compound is vanadium trichloride.

20. The composition of claim 18 wherein the vanadium compound is vanadium oxytrichloride.

21. The composition of claim 10 wherein the deactivating agent is an anhydrous hydrogen halide.

22. The composition of claim 21 wherein the titanium compound is a titanium tetraalkoxide, the zirconium compound is a zirconium tetraalkoxide, the vanadium compound is selected from the group consisting of vanadium trichloride, vanadium tetrachloride, vanadium oxydichloride, vanadium oxytrichloride, and vanadium oxytrialkoxide, the organoaluminum compound is a alkylaluminum dihalide, and the organoaluminum promoter is a lower alkyl trialkylaluminum.

23. The composition of claim 22 wherein the titanium tetraalkoxide is titanium tetrabutoxide, the zirconium tetraalkoxide is zirconium tetrabutoxide, the alkylaluminum dihalide is ethylaluminum dichloride, and the lower alkyl trialkylaluminum promoter is triethylaluminum.

24. The composition of claim 23 wherein the hydrogen halide is hydrochloric acid.

25. The composition of claim 24 wherein the vanadium compound is vanadium trichloride.

26. The composition of claim 24 wherein the vanadium compound is vanadium oxytrichloride.

27. The composition of claim 21 wherein the titanium tetraalkoxide is titanium tetrabutoxide, the zirconium tetraalkoxide is zirconium tetrabutoxide, the alkylaluminum dihalide is ethylaluminum dichloride, and the lower alkyl trialkylaluminum promoter is triisobutylaluminum.

28. The composition of claim 27 wherein the hydrogen halide is hydrochloric acid.

29. The composition of claim 28 wherein the vanadium compound is vanadium trichloride.

30. The composition of claim 28 wherein the vanadium compound is vanadium oxytrichloride.

31. An olefin polymerization catalyst composition useful in the preparation of polyolefins having a broad and controllable molecular weight distribution comprising
   (a) an active component prepared by reacting ethylaluminum dichloride with a mixture comprising titanium tetrabutoxide, zirconium tetrabutoxide, and vanadium trichloride or vanadium oxytrichloride, wherein the atomic ratio of titanium to zirconium ranges from about 0.2 to about 2, the atomic ratio of titanium to vanadium ranges from about 0.2 to about 2, and the atomic ratio of aluminum to the sum of the titanium, zirconium, and vanadium ranges from about 2 to about 20; and
   (b) an organoaluminum promoter selected from the group consisting of triethylaluminum and triisobutylaluminum.

32. The composition of claim 31 wherein the (a) component has been treated with an effective amount, ranging up to about 10 mols per mol of metal-alkyl groups contained in (a), of a lower aliphatic alcohol.

33. The composition of claim 31 wherein the (a) component has been treated with an effective amount, ranging up to about 10 mols per mol of metal-alkyl contained in (a), of anhydrous hydrogen halide.

* * * * *

UNITED STATES PATENT OFFICE
CERTIFICATE OF CORRECTION

Patent No. 4,154,701　　　　　Dated May 15, 1979

Inventor(s)　　　　　John L. Melquist

It is certified that error appears in the above-identified patent and that said Letters Patent are hereby corrected as shown below:

| Patent Column | Line | |
|---|---|---|
| 12 (TABLE II) | 8 | "Pro-motor" should be -- Pro-moter -- |
| 13 | 21 | "tri-n-hexyl" should be -- tri-$\underline{n}$-hexyl -- |
| 13 (TABLE III) | 28 | "Pro-motor" should be -- Pro-moter -- |
| 15 | 53 | "AIR$_q$X$_{3-q}$" should be -- AlR$_q$X$_{3-q}$ -- |
| 15 | 63 | "AIR$_q$X$'_{3-q}$" should be -- AlR$_q$X$'_{3-q}$ -- |

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*